United States Patent
Ishikawa et al.

(10) Patent No.: US 9,099,705 B2
(45) Date of Patent: Aug. 4, 2015

(54) FUEL CELL SYSTEM, AND CONTROL METHOD FOR FUEL CELL SYSTEM

(75) Inventors: Tomotaka Ishikawa, Torrance, CA (US); Hironori Noto, Toukai (JP); Keigo Suematsu, Toyota (JP); Koichiro Yamashita, Seto (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 141 days.

(21) Appl. No.: 13/640,226

(22) PCT Filed: Feb. 24, 2011

(86) PCT No.: PCT/IB2011/000379
§ 371 (c)(1),
(2), (4) Date: Nov. 14, 2012

(87) PCT Pub. No.: WO2011/124954
PCT Pub. Date: Oct. 13, 2011

(65) Prior Publication Data
US 2013/0065091 A1    Mar. 14, 2013

(30) Foreign Application Priority Data
Apr. 9, 2010   (JP) .................................. 2010-089969

(51) Int. Cl.
*H01M 8/04* (2006.01)
*H01M 8/24* (2006.01)
(Continued)

(52) U.S. Cl.
CPC ........ *H01M 8/04947* (2013.01); *H01M 8/0488* (2013.01); *H01M 8/0494* (2013.01); *H01M 8/04223* (2013.01); *H01M 8/04268* (2013.01); *H01M 8/04298* (2013.01); *H01M 8/04313* (2013.01); *H01M 8/04365* (2013.01); *H01M 8/04373* (2013.01); *H01M 8/04537* (2013.01); *H01M 8/04559* (2013.01); *H01M 8/04589* (2013.01); *H01M 8/04619* (2013.01);
(Continued)

(58) Field of Classification Search
USPC ...................................... 429/9, 428, 430–433
See application file for complete search history.

(56) References Cited

U.S. PATENT DOCUMENTS

2006/0088738 A1   4/2006  Aso
2006/0246329 A1   11/2006 Gopal
(Continued)

FOREIGN PATENT DOCUMENTS

JP   2004-342461 A   12/2004
JP   2005-019033 A   1/2005
(Continued)

*Primary Examiner* — Basia Ridley
*Assistant Examiner* — Caitlin Wilmot
(74) *Attorney, Agent, or Firm* — Kenyon & Kenyon LLP

(57) ABSTRACT

A fuel cell system includes: a fuel cell; a secondary cell that receives and stores surplus power by which output of the fuel cell is greater than power demanded of the system if the output is so, and that compensates for shortfall by which the output of the fuel cell is less than the power demanded of the system if the output is so; a voltage measurement portion that measures voltage of the fuel cell; a current measurement portion that measures current of the fuel cell; and a control portion that performs a control such that the voltage of the fuel cell does not exceed or equal a pre-set high-potential avoidance voltage. If a current-voltage characteristic of the fuel cell declines by at least a pre-determined amount from an early-period level, the control portion re-sets the high-potential avoidance voltage to a value that is smaller than an early-period set value.

4 Claims, 9 Drawing Sheets

(51) Int. Cl.
*H01M 10/48* (2006.01)
*H01M 10/615* (2014.01)
*H01M 10/63* (2014.01)
*H01M 16/00* (2006.01)
*H01M 8/10* (2006.01)

(52) U.S. Cl.
CPC ...... *H01M8/04649* (2013.01); *H01M 8/04731* (2013.01); *H01M 8/04753* (2013.01); *H01M 8/04858* (2013.01); *H01M 8/04992* (2013.01); *H01M 10/486* (2013.01); *H01M 10/502* (2013.01); *H01M 10/5006* (2013.01); *H01M 16/006* (2013.01); *H01M 8/04798* (2013.01); H01M 2008/1095 (2013.01); Y02E 60/50 (2013.01)

(56) References Cited

U.S. PATENT DOCUMENTS

| | | |
|---|---|---|
| 2008/0248351 A1 | 10/2008 | Wake |
| 2008/0278130 A1 | 11/2008 | Ito |
| 2009/0148735 A1 | 6/2009 | Manabe et al. |
| 2011/0033762 A1 | 2/2011 | Yoshida |

FOREIGN PATENT DOCUMENTS

| | | |
|---|---|---|
| JP | 2007-5038 A | 1/2007 |
| JP | 2007-157604 A | 6/2007 |
| JP | 2007-184243 A | 7/2007 |
| JP | 2009-129647 A | 6/2009 |
| JP | 2009-220765 A | 10/2009 |
| JP | 4397938 B2 | 10/2009 |
| WO | 01-03215 A1 | 1/2001 |
| WO | 2009-078339 A | 6/2009 |

WHEN DEMANDED POWER Preq1<LOWER-LIMIT POWER Plow, Plow-Preq1 IS STORED INTO SECONDARY CELL WHEN DEMANDED POWER Preq2>LOWER-LIMIT POWER Plow, CURRENT IS SET TO I2 TO OUTPUT DEMANDED POWER

FUEL CELL SYSTEM, AND CONTROL METHOD FOR FUEL CELL SYSTEM

This is a 371 national phase application of PCT/IB2011/000379 filed 24 Feb. 2011, claiming priority to Japanese Patent Application No. 2010-089969 filed 9 Apr. 2010, the contents of which are incorporated herein by reference.

BACKGROUND OF THE INVENTION

1. Field of the Invention

The invention relates to a fuel cell system that has a secondary cell, and to a control method for the fuel cell system.

2. Description of the Related Art

Known control methods for a fuel cell system that has a battery (secondary cell) include, for example, a control method described in Japanese Patent Application Publication No. 2007-5038 (JP-A-2007-5038). A control unit of the fuel cell system described in Japanese Patent Application Publication No. 2007-5038 (JP-A-2007-5038) performs a control of firstly restricting the output voltage Vfc of the fuel cell with reference to an oxidation-reduction potential, and using the battery to compensate for a power that corresponds to the restriction in output voltage, even when the demanded system electric power Wreq is gradually increasing. After that, the control unit keeps the output voltage of the fuel cell at or below the oxidation-reduction potential and thus continues electricity generation by the fuel cell even in the case the need for the electricity generation disappears due to a drop of the amount of accelerator operation, or the like. The control unit stores the surplus electric power provided in the foregoing case into the secondary cell.

The fuel cell usually degrades and its characteristics and the state of the fuel cell change as it is used for a long time. In the foregoing related-art technology, how to perform the electric charging control of the battery (secondary cell) in association with changes in the characteristics and the state of the fuel cell is not fully considered. Besides, in the case where the fuel cell has not degraded but the temperature of the fuel cell or the battery is low, it is preferable to change the operation method to a method that is optimum for raising the temperature of the fuel cell or the battery. However, the devising in that respect in the related-art technology is actually not sufficient.

SUMMARY OF THE INVENTION

The invention improves the durability of a fuel cell or restrains the degradation in the driveability of a vehicle in which the fuel cell is mounted, by controlling the charging of a secondary cell in accordance with the state of the fuel cell such as degradation, temperature, etc. Besides, in the case where the temperature of the fuel cell or the battery is low, a control of raising the temperature thereof is performed.

A fuel cell system in accordance with a first aspect of the invention includes: a fuel cell; a secondary cell that receives and stores surplus electric power by which output electric power of the fuel cell is greater than demanded electric power which is demanded of the fuel cell system if the output electric power is so, and that compensates for shortfall by which the output electric power of the fuel cell is less than the demanded electric power demanded of the fuel cell system if the output electric power is so; a voltage measurement portion that measures voltage of the fuel cell; a current measurement portion that measures electric current of the fuel cell; and a control portion that performs a control such that the voltage of the fuel cell does not become greater than or equal to a pre-set high-potential avoidance voltage, wherein if a current-voltage characteristic of the fuel cell declines to a level that is lower by at least a pre-determined amount than a level of the current-voltage characteristic of the fuel cell which occurs during an early period, the control portion executes at least one of (i) an operation of re-setting the high-potential avoidance voltage to a value that is smaller than an early-period set value and (ii) an operation of re-setting a remaining charge target value that is a lower-limit of amount of charge held by the second cell to a value that is larger than a set value used during the early period. According to the first aspect of the invention, by delaying the progress of degradation of the fuel cell, it becomes possible to improve the durability of the fuel cell or improve the driveability of a vehicle in which the fuel cell is mounted.

Besides, the control portion may execute at least one of (i) the operation of re-setting the high-potential avoidance voltage to a value that is smaller than the early-period set value and (ii) the operation of re-setting the remaining charge target value of the second cell (200) to a value that is larger than the early-period set value, if accumulated working time of the fuel cell (100) becomes longer than or equal to a pre-determined time. If the accumulated working time of a fuel cell increases, the fuel cell degrades. Therefore, using the accumulated working time, it becomes possible to easily detect degradation of the fuel cell.

Besides, the control portion may execute at least one of (i) an operation of causing difference between the value of the high-potential avoidance voltage obtained after re-setting and the early-period set value to become larger as the accumulated working time of the fuel cell increases, and (ii) an operation of causing difference between the value of the remaining charge target value obtained after re-setting and the early-period set value to become larger as the accumulated working time of the fuel cell increases. Generally, the longer the accumulated working time, the more the degradation progresses. By making the difference from the early-period value (or initial value) larger the more degraded the fuel cell is, it becomes possible to delay the progress of the degradation of the fuel cell so as to improve the durability of the fuel cell or improve the driveability of a vehicle that uses the fuel cell.

A fuel cell system in accordance with a second embodiment of the invention includes: a fuel cell; a secondary cell that receives and stores surplus electric power by which output electric power of the fuel cell is greater than demanded electric power which is demanded of the fuel cell system if the output electric power is so, and that compensates for shortfall by which the output electric power of the fuel cell is less than the demanded electric power demanded of the fuel cell system if the output electric power is so; a voltage measurement portion that measures voltage of the fuel cell; a current measurement portion that measures electric current of the fuel cell; a temperature measurement portion that measures at least one of temperature of the secondary cell and temperature of the fuel cell; and a control portion that controls amount of flow of an oxidizing gas that is supplied to the fuel cell, wherein the control portion executes at least one of (i) an operation in which if the temperature of the secondary cell is lower than a pre-determined lower-limit temperature, the control portion causes the amount of flow of the oxidizing gas to be less than if the temperature of the secondary cell is higher than a pre-determined temperature, and the control portion, for a demanded output demanded of the fuel cell system, decreases the output of the fuel cell and increases output of the secondary cell, and (ii) an operation in which if the temperature of the fuel cell is lower than a pre-determined lower-limit temperature, the control portion, while preventing the voltage of the fuel cell from becoming greater than or equal to a pre-determined high-potential avoidance voltage, causes the amount of flow of the oxidizing gas to be less than if the temperature of the fuel cell is higher than a pre-determined temperature, and the control portion causes a heat loss in a low-current region in an current-voltage characteristic of the fuel cell in which the voltage is higher than or equal to the high-potential avoidance voltage in a state before reduction of the amount of flow of the oxidizing gas, and raises the temperature of the fuel cell by using thermal energy obtained through the heat loss. According to the second aspect, when the temperature of the secondary cell of the fuel cell is low, the temperature thereof can be raised.

A control method for a fuel cell system in accordance with a third aspect of the invention includes: (a) acquiring a current-voltage characteristic of a fuel cell; (b) determining whether or not the current-voltage characteristic has declined to a level that is lower by at least a pre-determined amount than an early-period level of the current-voltage characteristic occurring during an early period; and (c) executing at least one of (i) an operation of re-setting a high-potential avoidance voltage to a value that is less than an early-period set value, if the current-voltage characteristic of the fuel cell has declined to the level that is lower by at least the pre-determined amount than the early-period level of the current-voltage characteristic of the fuel cell, and (ii) an operation of re-setting a remaining charge target value of the secondary cell that is a lower limit of amount of charge held by the secondary cell to a value that is larger than a set value used during the early period, if the current-voltage characteristic of the fuel cell has declined to the level that is lower by at least the pre-determined amount than the early-period level of the current-voltage characteristic of the fuel cell.

The invention can be realized in various forms, for example, a fuel cell system, a control method for a fuel cell system, and other various forms.

BRIEF DESCRIPTION OF THE DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
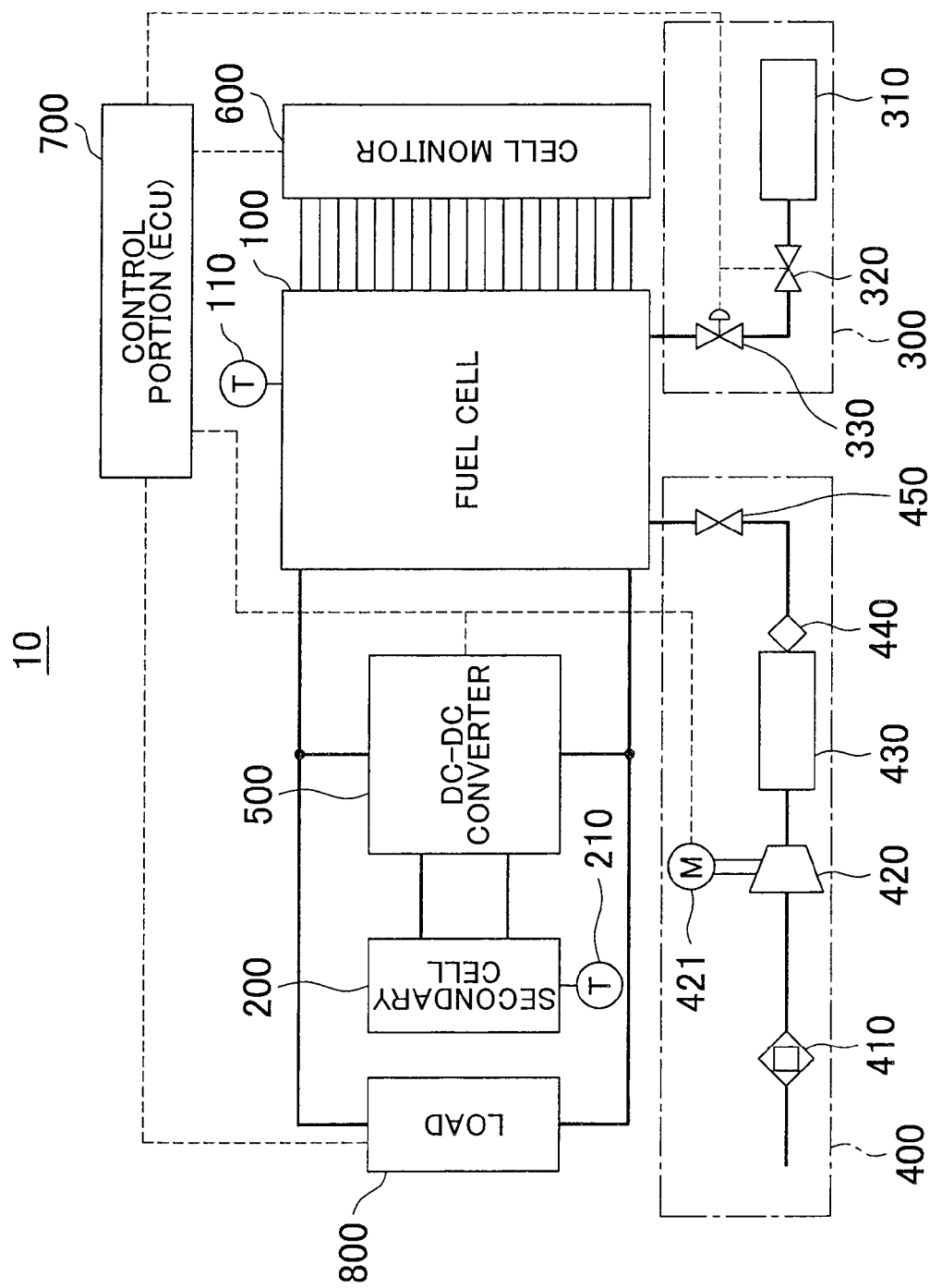
FIG. 1 is an illustrative diagram showing a general construction of a fuel cell system in accordance with an embodiment of the invention.

FIG. 1 is an illustrative diagram showing a general construction of a fuel cell system in accordance with a first embodiment of the invention. A fuel cell system 10 includes a fuel cell 100, a secondary cell 200, a fuel gas supply portion 300, an oxidizing gas supply portion 400, a DC-DC converter 500, a cell monitor 600, and a control portion 700. The fuel cell system 10 supplies electric power to a load 800. The fuel cell 100 includes a plurality of unit cells (not shown). Each unit cell is connected to the cell monitor 600, so that the state of each unit cell, for example, the voltage and the electric current thereof, can be monitored. Besides, a thermometer 110 is connected to the fuel cell 100, so that the temperature of the fuel cell 100 can be monitored.

The fuel gas supply portion 300 is connected to the fuel cell 100. In the first embodiment, hydrogen is used as a fuel gas. The fuel gas supply portion 300 has a fuel gas tank 310, a shutoff valve 320, and a regulator 330. The shutoff valve 320, when the fuel cell system 10 is stopped, closes to stop the supply of hydrogen gas. The regulator 330 regulates the pressure of hydrogen to be supplied to the fuel cell 100.

The oxidizing gas supply portion 400 is connected to the fuel cell 100. In the first embodiment, air is used as an oxidizing gas. The oxidizing gas supply portion 400 has an air cleaner 410, an air pump 420, an intercooler 430, and a filter 440. The air cleaner 410 removes undesired pieces, dirt, etc. from air when air is taken in from the atmosphere. The air pump 420 compresses air and supplies the compressed air to the fuel cell 100. An electric motor 421 is connected to the air pump 420. The intercooler 430 cools the air that has become heated due to compression. The filter 440 removes small particles of dirt and dust that have escaped the air cleaner 410.

The secondary cell 200 is connected to the fuel cell 100 via the DC-DC converter 500, and functions as an electric power source that is auxiliary to the fuel cell 100. That is, when the output of the fuel cell 100 is less than the output demanded by the load 800, the secondary cell 200 outputs the difference therebetween for compensation. On the other hand, when the output of the fuel cell 100 is greater than the output demanded by the load 800, the secondary cell 200 receives and stores the difference therebetween, that is, the surplus. The secondary cell 200 adopted herein may be, for example, a lead storage cell, a nickel hydride cell, a lithium-ion cell, etc. A thermometer 210 is attached to the secondary cell 200, so that the temperature of the secondary cell 200 can be monitored.

The DC-DC converter 500 has a function as a charging-discharging control portion that controls the charging and discharging of the secondary cell 200. That is, upon a command from the control portion 700, the DC-DC converter 500 controls the charging and discharging of the secondary cell 200, and variably adjusts the voltage level that is applied to the load 800.

The control portion 700 (also referred to as "ECU (electronic control unit) 700") can be constructed as a microcomputer that has a main storage unit and a central processing unit. The control portion 700, according to the output demanded by the load 800, controls the regulator 330 to control the amount of fuel gas supplied, and controls the electric motor 421 to control the amount of oxidizing gas supplied. Besides, the control portion 700 controls the DC-DC converter 500 according to the output demanded by the load 800.

Figure 2A:
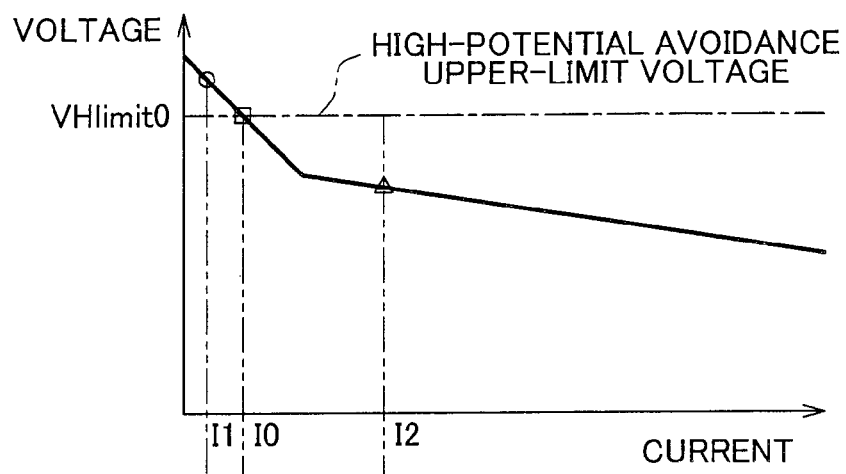
FIGS. 2A and 2B are graphs showing characteristics of a fuel cell.
Figure 2B:
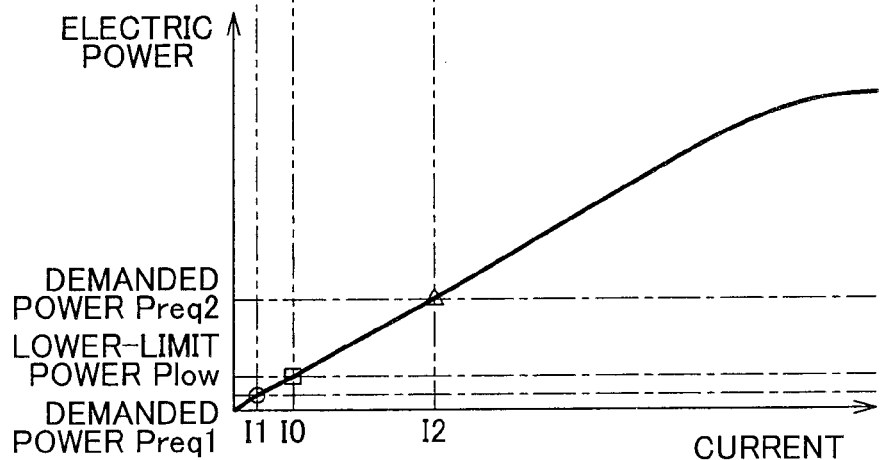

FIGS. 2A and 2B are graphs showing characteristics of the fuel cell. FIG. 2A is a graph showing a current-voltage characteristic of the fuel cell, and FIG. 2B is a graph showing a current-output characteristic thereof. As shown in FIG. 2A, the output voltage of the fuel cell 100 decreases with increases in the output current of the fuel cell 100. On the other hand, the output electric power of the fuel cell increases with increases in the output current of the fuel cell 100, as shown in FIG. 2B. In FIG. 2A, a line that shows a high-potential avoidance upper-limit voltage VHlimit0 is presented. The control portion 700 controls the fuel cell 100 so that the output voltage thereof does not become higher than the high-potential avoidance upper-limit voltage VHlimit0. A reason for this control is that if the output voltage of the fuel cell 100 is higher than the high-potential avoidance upper-limit voltage VHlimit0, the elution of a catalyst metal (e.g., platinum) from a catalyst (not shown) of the fuel cell 100 becomes more likely to occur, and degradation of the fuel cell 100 becomes more likely to occur.

In the first embodiment, the current occurring when the output voltage of the fuel cell 100 becomes equal to the high-potential avoidance upper-limit voltage VHlimit0 is herein termed the current I0. Incidentally, the high-potential avoidance upper-limit voltage VHlimit0 is empirically set beforehand as a voltage value that is lower than the open circuit voltage (OCV), and that can prevent or mitigate the elution of the catalyst metal. The output electric power occurring in this condition is termed Plow as shown in FIG. 2B. The output electric power Plow is, a lower limit of output, and therefore is termed the lower-limit output Plow as well. As for the fuel cell 100, if the output voltage thereof is kept less than or equal to the high-potential avoidance upper-limit voltage VHlimit0, the output of the fuel cell 100 does not become less than or equal to the lower-limit output Plow. For example, in the case where a demanded electric power Preq1 of the load 800 is smaller than the lower-limit output Plow as in an idling state, the amount of Plow-Preq1 is a surplus. Then, the control portion 700 commands the DC-DC converter 500 to store the surplus (Plow-Preq1) into the secondary cell 200.

On the other hand, in the case where a demanded electric power Preq2 of the load 800 is greater than the lower-limit output Plow, the control portion 700 increases the current that is drawn out from the fuel cell 100 to a value I2. The output of the fuel cell at this time is the demanded electric power Preq2 that the load 800 demands. Incidentally, for the secondary cell 200, a target value of the amount of charge (also referred to as "SOC (state of charge)") (which is, for example, a percentage relative to the total amount of charge in the secondary cell 200) is predetermined. When the amount of charge in the secondary cell 200 is less than the target value, the output current of the fuel cell 100 may be made larger than the value I2 to increase the output electric power of the fuel cell 100, and the difference thus made may be stored into the secondary cell 200. Besides, when the duration of the idling state is long and the amount of charge in the secondary cell 200 exceeds the target value, the control portion 700 may make the output current of the fuel cell 100 less than the value I2 to make the output electric power of the fuel cell 100 correspondingly smaller. At this time, the output electric power of the fuel cell 100 becomes smaller than the demanded electric power of the load 800; however, the shortfall can be offset by the output of the secondary cell 200. Thus, it becomes possible to lower the amount of charge in the secondary cell 200 to the target value.

Figure 3A:
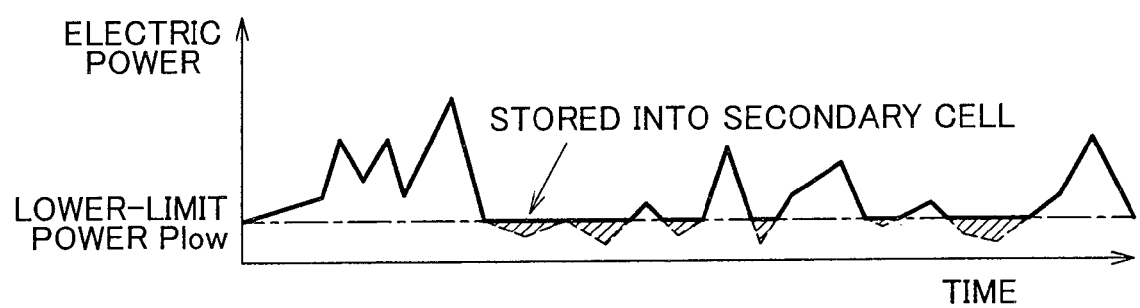
FIGS. 3A and 3B are graphs showing time-dependent changes in the output electric power of a fuel cell.
Figure 3B:
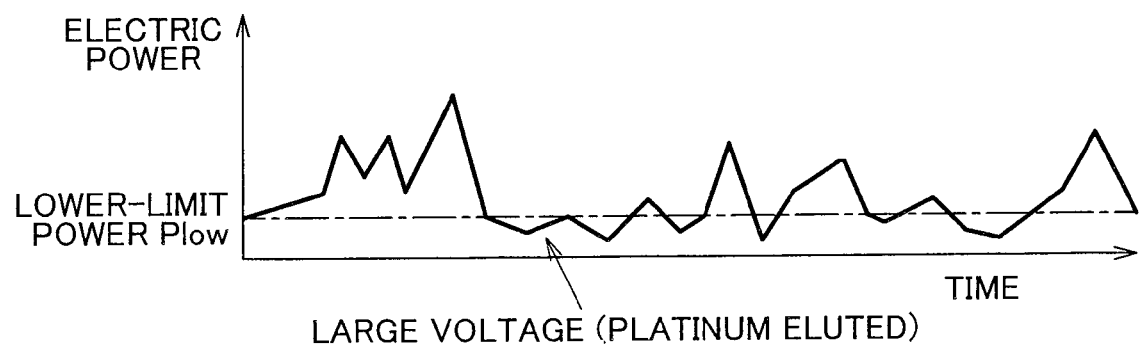

FIGS. 3A and 3B are graphs showing time-dependent changes in the output electric power of the fuel cell. FIG. 3A shows time-dependent changes in the output electric power in the case where a high-potential avoidance upper-limit voltage is set, and FIG. 3B shows time-dependent changes in the output electric power in the case where a high-potential avoidance upper-limit voltage is not set. As shown in FIG. 3A, in the case where the high-potential avoidance upper-limit voltage is set, the output electric power of the fuel cell does not become lower than the lower-limit electric power Plow, and when the demanded electric power of the load 800 is less than the lower-limit electric power Plow, the difference (Plow—demanded electric power) is stored into the secondary cell 200. On the other hand, in the case where the high-potential avoidance upper-limit voltage is not set, when the demanded electric power of the load 800 is less than the lower-limit electric power Plow, the output electric power of the fuel cell 100 also becomes small, and during a period during which the demanded electric power of the load 800 is smaller than the lower-limit electric power Plow, the catalyst metal (e.g., platinum) is likely to be eluted.

Figure 4A:
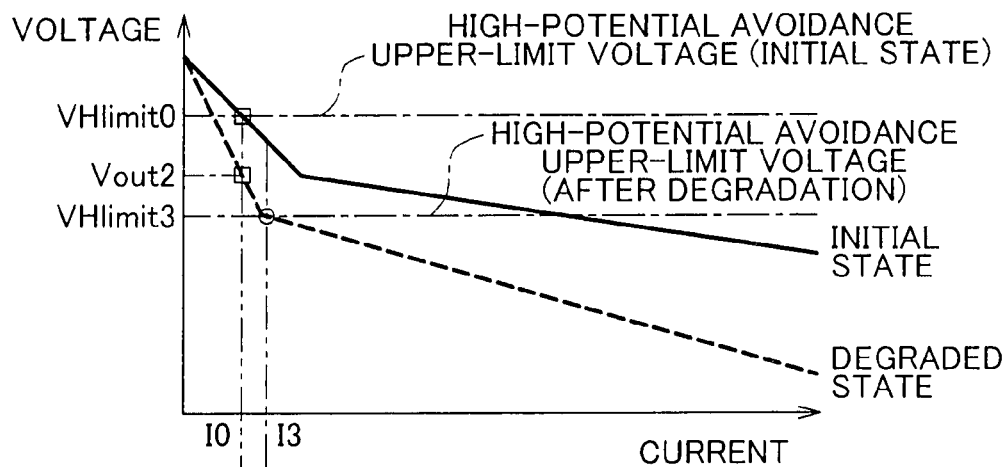
FIGS. 4A to 4C are illustrative diagrams showing the characteristics of a fuel cell during an initial state of the fuel cell and during a degraded state thereof.
Figure 4B:
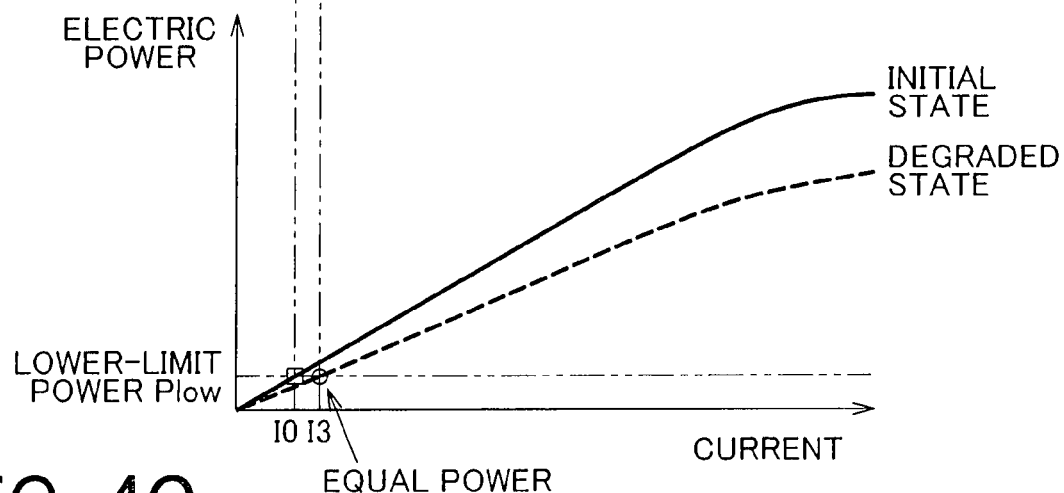
Figure 4C:
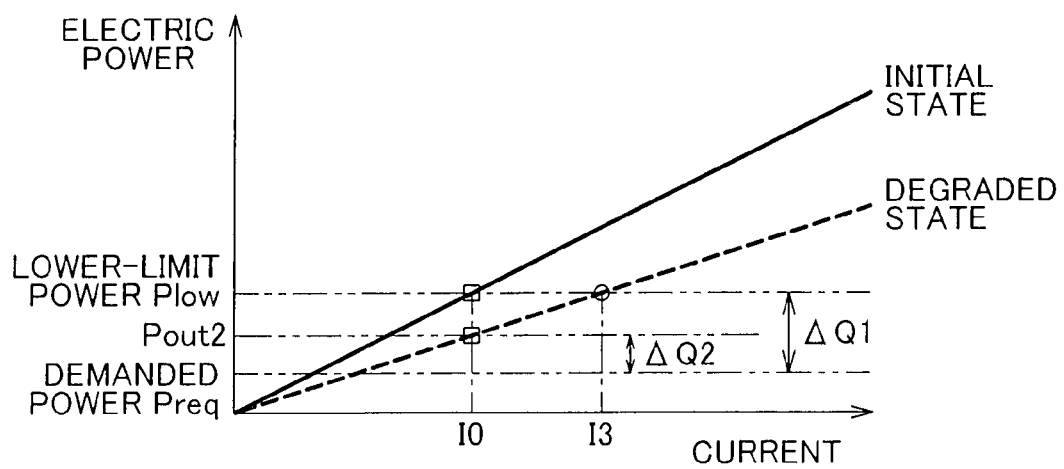

FIGS. 4A to 4C are illustrative diagrams showing characteristics of the fuel cell during an initial or early state and during a degraded state in comparison. FIG. 4A is a graph showing current-voltage characteristics of the fuel cell, and FIG. 4B is graph showing current-output characteristics thereof, and FIG. 4C is an enlarged graph of a portion of the graph shown in FIG. 4B. When the fuel cell 100 is degraded, the output voltage and the output electric power become smaller for a fixed output current. For example, when an output current I0 of the fuel cell 100 that causes the output voltage to be the high-potential avoidance upper-limit voltage VHlimit0 when the fuel cell 100 is not degraded flows through the fuel cell 100 in a degraded state, the output voltage Vout2 and the output electric power Pout2 of the fuel cell 100 are less than VHlimit0 and Plow, respectively (Vout2<VHlimit0 and Pout2<Plow).

Figure 5:
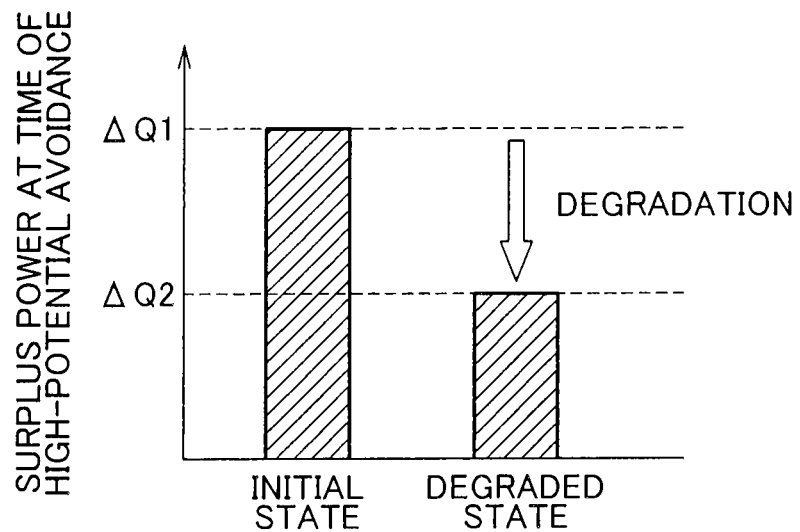
FIG. 5 is an illustrative diagram showing the surplus electric power during an initial state and the surplus electric power during a degraded state.

FIG. 5 is an illustrative diagram showing the surplus electric power during the initial state and the surplus electric power during the degraded state in comparison. The surplus electric power at the time of high-potential avoidance is equal to the difference between the electric power that the fuel cell 100 outputs (Plow or Pout2) and the electric power that the load 800 demands (Preq). That is, there is a surplus electric power of ΔQ1 (ΔQ1=Plow−Preq) during the initial state of the fuel cell 100, whereas during a degraded state, the surplus electric power drops to ΔQ2 (ΔQ2=Pout2−Preq).

In the first embodiment, the control portion 700 performs a control of lowering the high-potential avoidance upper-limit voltage as shown in FIG. 4A, when the fuel cell 100 is degraded. In the first embodiment, the control portion 700 determines, for example, such a high-potential avoidance upper-limit voltage VHlimit3 for the degraded state of the fuel cell 100 that the output electric power obtained at the high-potential avoidance upper-limit voltage during the degraded state becomes equal to the lower-limit electric power Plow obtained during the initial state. At this time, the output current of the fuel cell 100 increases to I3.

Figure 6:
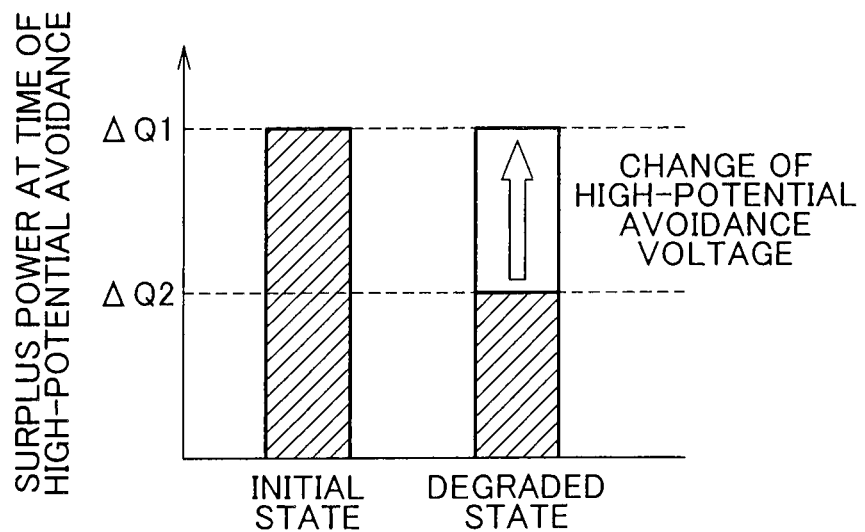
FIG. 6 is an illustrative diagram showing the surplus electric power obtained when the high-potential avoidance upper-limit voltage is lowered.

FIG. 6 is an illustrative diagram showing the surplus electric power that occurs when the high-potential avoidance upper-limit voltage is lowered. In the first embodiment, when the high-potential avoidance upper-limit voltage is lowered to VHlimit3, the output current increase from I0 to I3, and the output electric power of the fuel cell 100 increases from Pout1 to Plow. Therefore, the surplus electric power, that is, the difference between the output electric power of the fuel cell 100 and the demanded electric power Preq of the load increases from ΔQ2 to ΔQ1.

Figure 7:
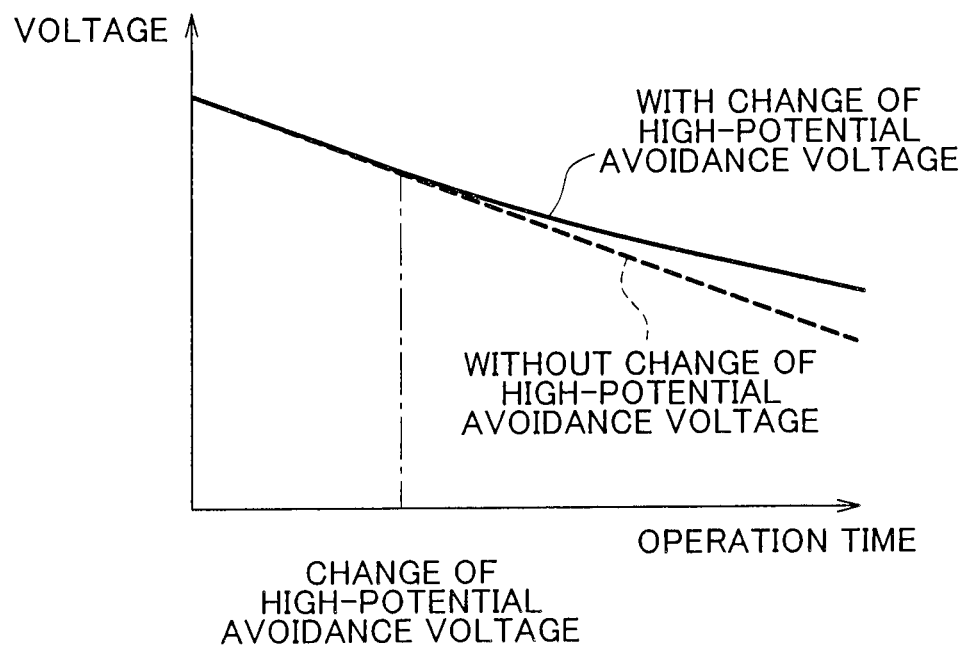
FIG. 7 is an illustrative diagram showing an effect of the embodiment of the invention.

FIG. 7 is an illustrative diagram showing effects of the first embodiment. In FIG. 7, the horizontal axis shows the accumulated operation time of the fuel cell 100, and the vertical axis shows the output voltage of the fuel cell 100. In general, the output voltage of the fuel cell gradually declines due to degradation as the operation time of the fuel cell increases. As the accumulated operation time increases, the accumulated time of operation in the vicinity of the high-potential avoidance upper-limit voltage VHlimit0 also increases, and therefore, little by little, the catalyst metal is eluted and thus the degradation of the fuel cell 100 progresses. In the first embodiment, when the fuel cell 100 has degraded to a certain degree, the high-potential avoidance upper-limit voltage is lowered to the high-potential avoidance upper-limit voltage VHlimit3. As a result, it becomes possible to mitigate the degradation of the fuel cell 100 from that time on.

The method of detecting the degradation of the fuel cell 100 is not described above. However, as an example of the method, the control portion 700 may monitor the output voltage occurring at a pre-determined output current, and may determine that the fuel cell 100 has degraded, when the output voltage has declined by a pre-determined amount (value) or more. Alternatively, the control portion 700 may estimate degradation of the fuel cell 100 on the basis of the operation time of the fuel cell 100 (the longer the operation time, the more the degradation progresses), the number of times of fluctuation of the electric potential of the fuel cell 100 (the greater the number, the more the degradation progresses), the temperature thereof (the higher the temperature, the more the degradation progresses), the humidified state thereof (the higher the humidified state, the more the degradation progresses), the number of times of starting and stopping the operation of the fuel cell 100 (the greater the number, the more the degradation progresses). Besides, the control portion 700 may lower the high-potential avoidance upper-limit voltage on the basis of the accumulated operation time of the fuel cell, without taking the degradation of the fuel cell 100 into account. This method is possible because the longer the accumulated operation time is, the more the degradation of the fuel cell 100 is considered to have progressed. This method merely requires the control portion 700 to measure only the accumulated time, and eliminates the need to measure the degradation of the fuel cell. Incidentally, the control portion 700 may increase the width of the reduction in the high-potential avoidance upper-limit voltage with increases in the accumulated time. This is because the longer the accumulated time is, the more the degradation of the fuel cell 100 is considered to have progressed.

Figure 8:
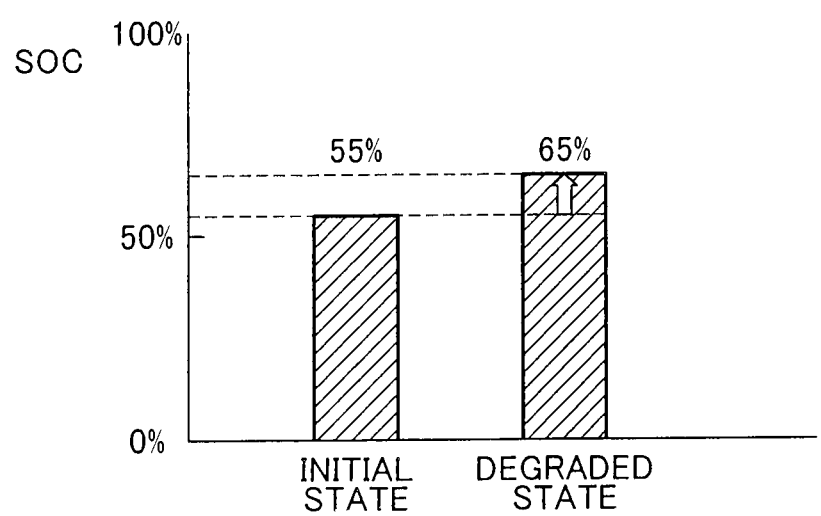
FIG. 8 is an illustrative diagram showing a second embodiment of the invention.

FIG. 8 is an illustrative diagram showing a second embodiment of the invention. The construction of the second embodiment is substantially the same as the construction of the first embodiment. A difference of the second embodiment is the control performed on a fuel cell 100. In the second embodiment, when the fuel cell 100 is degraded, the control portion 700 raises the target value of the amount of charge (SOC) stored in the secondary cell 200. In the second embodiment, when the fuel cell 100 is degraded, the control portion 700 raises the target value of the amount of charge of the secondary cell 200 from the initial value of 55% to a value of 65%.

As shown in FIG. 5, when the fuel cell 100 is degraded, the surplus electric power reduces. In other words, during an initial or early period, the surplus electric power is great. Therefore, if the target value of the amount of charge (SOC) of the secondary cell 200 is small, the amount of charge of the secondary cell sometimes reaches 100%. When the amount of charge of the secondary cell reaches 100%, no more charging can be carried out, and therefore there arises a need to lower the electric power generated by the fuel cell 100 or cause the load 800 to consume more electric power. However, if the electric power generated by the fuel cell 100 is lowered, the output voltage thereof rises. As a result, there arises a risk of elution of the catalyst metal and therefore degradation of the fuel cell 100. On the other hand, if the load 800 is caused to consume more electric power, useless energy consumption results. Therefore, it is preferable that the target value of the amount of charge of the secondary cell 200 be set at a relatively small value.

Figure 9A:
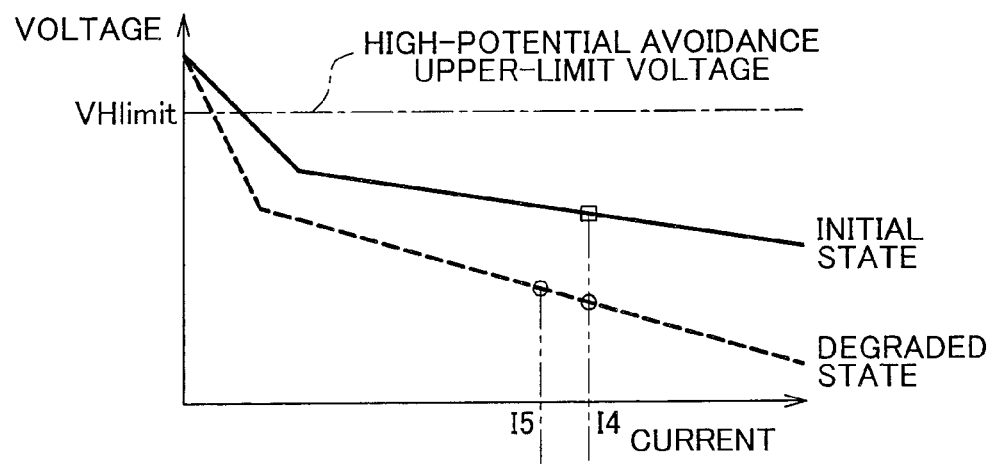
FIGS. 9A and 9B are illustrative diagrams showing characteristics of a fuel cell in accordance with a second embodiment of the invention.
Figure 9B:
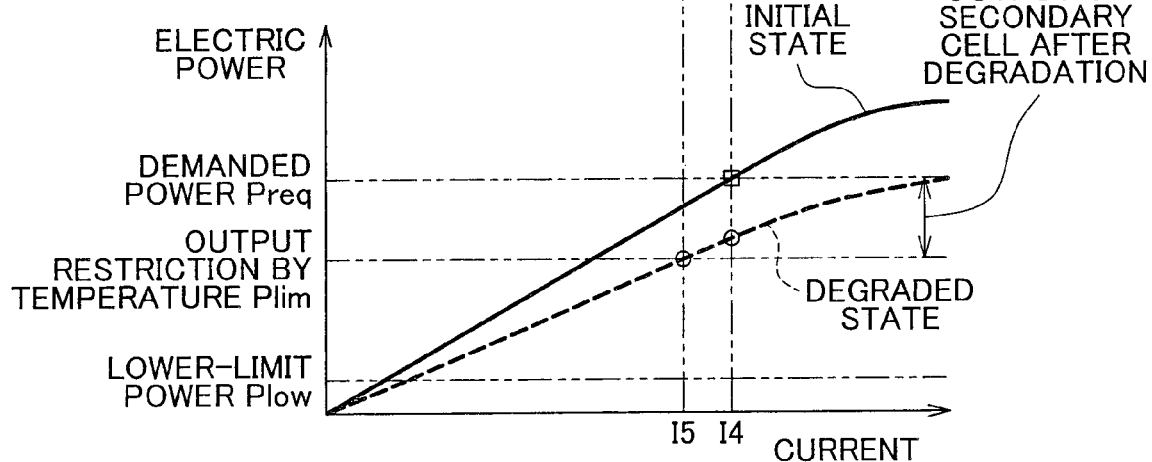

FIGS. 9A and 9B are illustrative diagrams showing characteristics of the fuel cell in the second embodiment. FIG. 9A is a graph showing current-voltage characteristics of the fuel cell, and FIG. 9B is a graph showing current-electric power characteristics thereof. When the load 800 demands an output electric power Preq2 of the fuel cell system during an initial or early period, the fuel cell 100 is able to output the electric power demanded by the load 800, by sending out an output current I4. However, when the load 800 demands the electric power Preq2 after the fuel cell 100 is degraded, the demand of the load 800 cannot be met merely by the fuel cell 100 sending out the output current I4, and the shortfall needs to be offset by the corresponding electric power from the secondary cell 200.

Incidentally, as the fuel cell 100 degrades, the internal resistance of the fuel cell 100 increases, and therefore the heat generation of the fuel cell 100 increases. In such a case, the control portion 700 restricts the output of the fuel cell 100. Therefore, the fuel cell 100 can send out only an output current I5 that is smaller than the output current I4, so that the output power of the fuel cell 100 is restricted to Plim. In this case, the supplemental electric power that the secondary cell 200 needs to output increases. In this situation, if the target value of the amount of charge of the secondary cell 200 during the degraded state of the fuel cell 100 is set relatively large, the load 800 can be supplied with electric power from the secondary cell 200 for a long time. That is, since the sum of the output of the fuel cell 100 and the output of the secondary cell 200 is unlikely to be lower than the demanded electric power, the foregoing control process can restrain degradation in the driveability of the vehicle.

Incidentally, in the second embodiment, too, the control portion 700 may raise the target value of the amount of charge of the secondary cell 200 merely on the basis of the accumulated operation time of the fuel cell. This is because the longer the accumulated operation time is, the more the degradation of the fuel cell 100 is considered to have progressed. In this manner, the control portion 700 needs to measure only the accumulated time, and the need to measure the degradation of the fuel cell disappears. Incidentally, the control portion 700 may increase the width of reduction in the target value of the amount of charge of the secondary cell 200 with increases in the accumulated time. This is because the longer the accumulated time is, the more the degradation of the fuel cell 100 is considered to have progressed.

A third embodiment of the invention has substantially the same construction as the first and second embodiments. In the third embodiment, a control portion 700 performs a control such as to raise the temperature of the secondary cell 200 when the temperature thereof is low. Concretely, the control portion 700 lessens the amount of flow of the oxidizing gas.

Figure 10A:
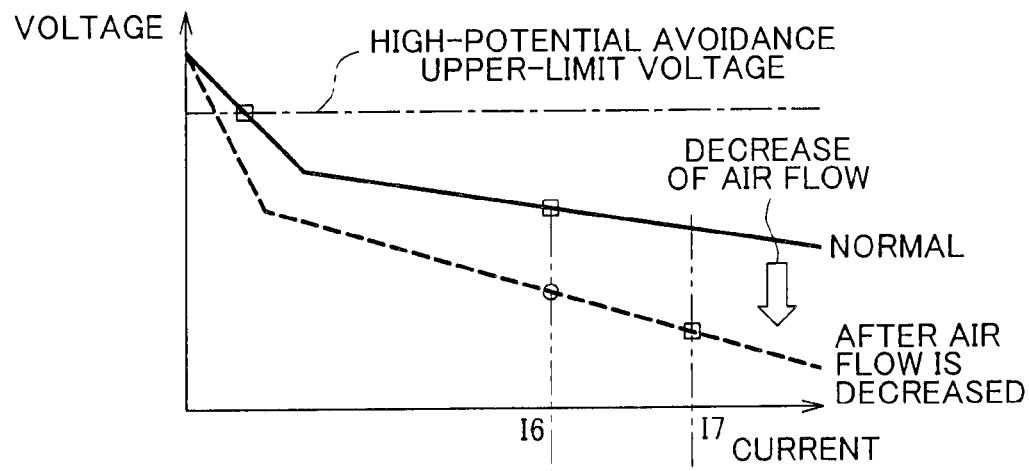
FIGS. 10a and 10B are diagrams illustrating a control of raising the temperature of a secondary cell.
Figure 10B:
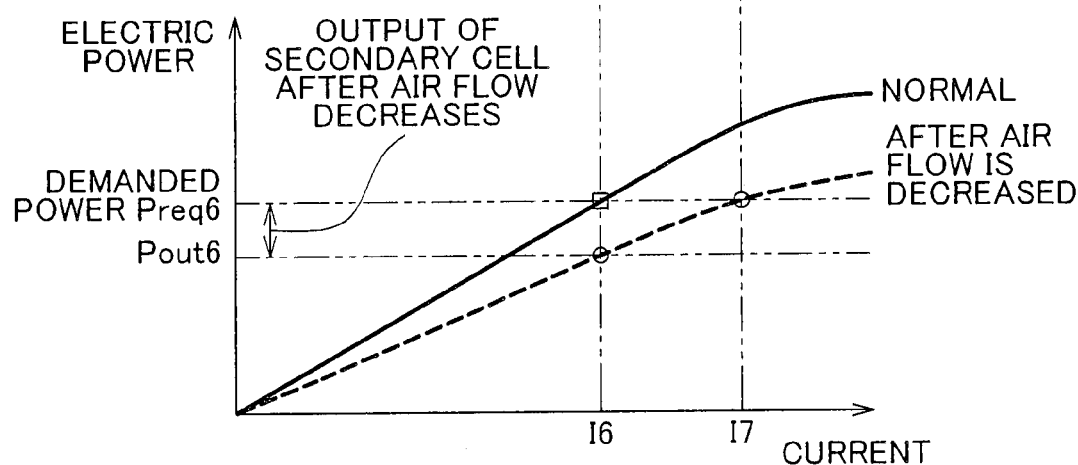

FIGS. 10A and 10B are diagrams illustrating a control of raising the temperature of a secondary cell. FIG. 10A is a graph showing current-voltage characteristics of the fuel cell, and FIG. 10B is a graph showing current-output (electric power) characteristics of the fuel cell. Through comparison between the graphs in FIG. 10A and FIG. 10B and the graphs in FIGS. 4A to 4C or FIGS. 9A and 9B, it can be understood that the characteristics in the case where the amount of flow of the oxidizing gas is reduced and the characteristics in the case where the fuel cell has degraded are similar to each other.

If the temperature of the secondary cell 200 is low, the control portion 700 lessens the amount of flow of air. In the case where the load 800 demands an output (electric power) of Preq6 of the fuel cell system, the control portion 700 can produce the demanded output by drawing out an output current I6 from the fuel cell 100 provided that the amount of flow of the oxidizing gas has not been decreased. On the other hand, in the case where the amount of flow of the oxidizing gas has been decreased, the control portion 700 can cause the fuel cell 100 to produce the demanded electric power by drawing out an output current I7 from the fuel cell 100. In the third embodiment, however, the control portion 700 draws out the output current I6 from the fuel cell 100. In this case, the output electric power of the fuel cell 100 is Pout6, and is smaller than the demanded electric power Preq6 of the load 800. The control portion 700 causes the secondary cell 200 to output an electric power that offsets the shortfall. As a result, the number of times of charging and discharging the secondary cell 200 increases, and thus the temperature of the secondary cell 200 can be increased.

In the second embodiment, the secondary cell is actively used in order to restrain the degradation in the driveability of the vehicle, whereas in the third embodiment, it is possible to raise the temperature of the secondary cell by actively using the secondary cell 200 on the basis of substantially the same operation principle as in the second embodiment.

A fourth embodiment has substantially the same construction as the first and second embodiments. In the fourth embodiment, a control portion 700 performs such a control as to raise the temperature of a fuel cell 100 when the temperature thereof is low. Concretely, the control portion 700 lessens the amount of flow of the oxidizing gas while maintaining the high-potential avoidance upper-limit voltage.

Figure 11A:
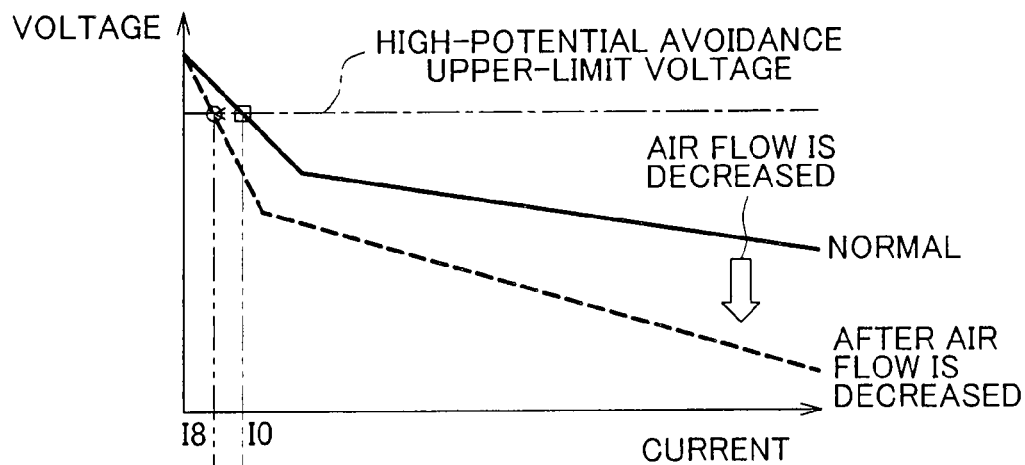
FIGS. 11A to 11C are diagrams illustrating a control of raising the temperature of a fuel cell.
Figure 11B:
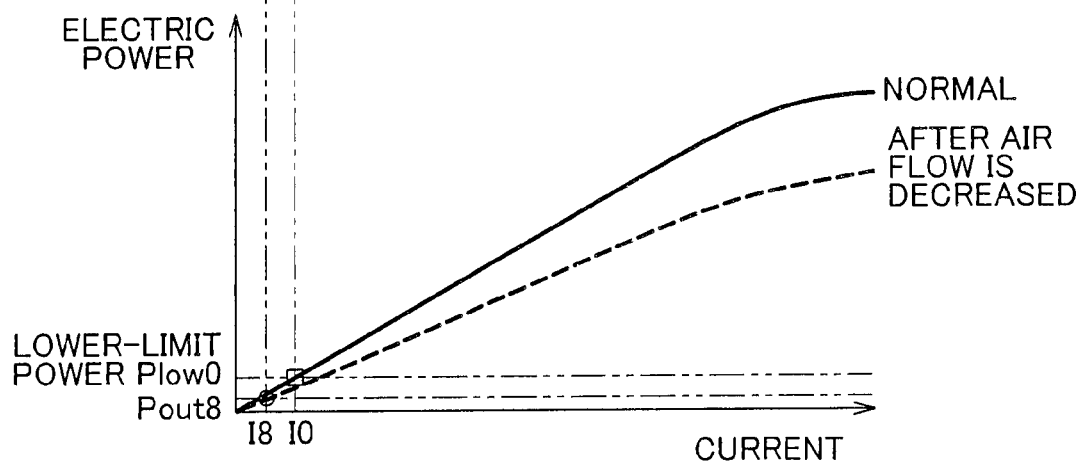
Figure 11C:
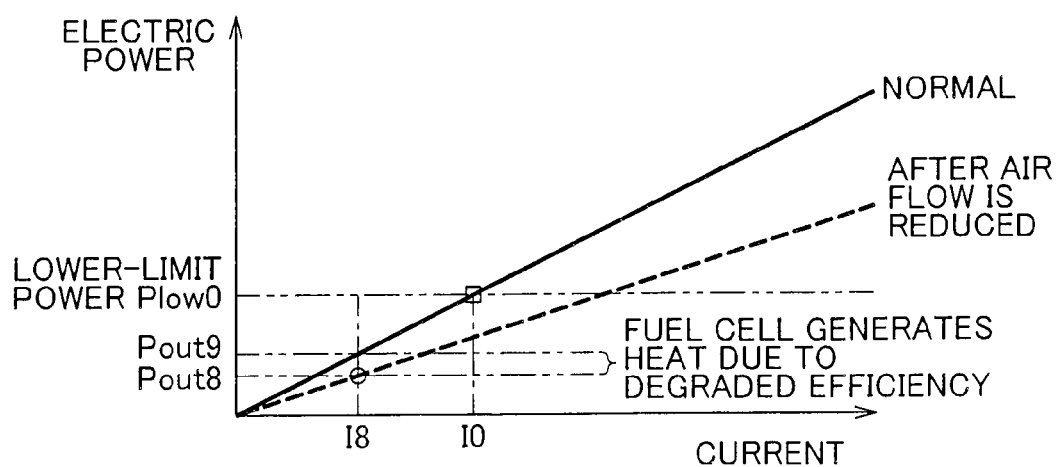

FIGS. 11A to 11C are diagram illustrating a control of raising the temperature of a fuel cell. FIG. 11A is a graph showing current-voltage characteristics of the fuel cell, and FIG. 11B is a graph showing current-output characteristics of the fuel cell. FIG. 11C is an enlarged graph of a portion of the graph shown in FIG. 11B. If the control portion 700 lessens the amount of flow (amount of supply) of the oxidizing gas while maintaining the high-potential avoidance upper-limit voltage, the output current of the fuel cell occurring at the high-potential avoidance upper-limit voltage decreases to I8. The output of the fuel cell occurring at this time is termed Pout8. On the other hand, the output of the fuel cell 100 occurring when the control portion 700 draws out the output current I8 from the fuel cell 100 without maintaining the high-potential avoidance upper-limit voltage while maintaining the amount of flow of the oxidizing gas is termed Pout9. It is to be noted that at this time, Pout9>Pout8. The output electric power of the fuel cell 100 is reduced by an amount (Pout9−Pout8) even if the control portion 700 draws out the same current from the fuel cell 100. That is, corresponding to this amount, the efficiency of the fuel cell 100 decreases, and the fuel cell 100 is heated. In the case where the fuel cell 100 is cold, the control portion 700 lessens the amount of flow of the oxidizing gas supplied to the fuel cell while maintaining the high-potential avoidance upper-limit voltage, whereby the efficiency of the fuel cell is lowered. Then, using the heat generated due to the reduction in the efficiency, the temperature of the fuel cell 100 can be raised.

With regard to the foregoing embodiments, arbitrary two or more of them, for example, the first embodiment and the second embodiment, may be simultaneously executed by the control portion 700. That is, the control portion 700 may raise the target value of the amount of charge of the secondary cell 200 and lower the high-potential avoidance upper-limit voltage, when the fuel cell 100 is degraded. Besides, in the case where the temperature of the fuel cell 100 and the temperature of the secondary cell 200 are both low, the control portion 700 may carry out the third and fourth embodiments simultaneously. Furthermore, in the case where the fuel cell 100 is degraded and the temperature of the fuel cell 100 and the temperature of the secondary cell 200 are both low, the control portion 700 may carry out all the foregoing embodiments.

While forms of carrying out the invention have been described above with reference to the various embodiments, the foregoing forms of carrying out the invention are merely for the purpose of facilitating the understanding of the invention, and do not limit the invention in any respect. It should be apparently understood that the invention can be changed or improved without departing from the scope of the invention or the range defined by the claims for patent, and include equivalents of what are described in the claims for patent.

The invention claimed is:

1. A fuel cell system comprising:
   a fuel cell;
   a secondary cell that receives and stores surplus electric power by which output electric power of the fuel cell is greater than demanded electric power which is demanded of the fuel cell system if the output electric power of the fuel cell is greater than the demanded electric power which is demanded of the fuel cell system, and that compensates for shortfall by which the output electric power of the fuel cell is less than the demanded electric power demanded of the fuel cell system if the output electric power of the fuel cell is less than the demanded electric power demanded of the fuel cell system;
   a voltage measurement portion that measures voltage of the fuel cell;
   a current measurement portion that measures electric current of the fuel cell; and
   a control portion that performs a control such that the voltage of the fuel cell does not become greater than or equal to a pre-set high-potential avoidance voltage,
   wherein the control portion is programmed to determine whether a current-voltage characteristic for the fuel cell has declined to a level that is lower by at least a predetermined amount than an early-period level of the current-voltage characteristic occurring during an early period and the control portion is to execute at least one of (i) an operation of re-setting the high-potential avoidance voltage to a value that is smaller than an early-period set value and (ii) an operation of re-setting a remaining charge target value that is a lower-limit of amount of charge held by the second cell to a value that is larger than a set value used during the early period, if the current-voltage characteristic of the fuel cell declines to a level that is lower by at least the predetermined amount than a level of the current-voltage characteristic of the fuel cell which occurs during an early period.

2. The fuel cell system according to claim 1, wherein the control portion is configured to execute at least one of
   (i) the operation of re-setting the high-potential avoidance voltage to a value that is smaller than the early-period set value and (ii) the operation of re-setting the remaining charge target value of the second cell to a value that is larger than the early-period set value, if accumulated working time of the fuel cell becomes longer than or equal to a pre-determined time.

3. The fuel cell system according to claim 2, wherein the control portion is configured to execute at least one of (i) an operation of causing difference between the value of the high-potential avoidance voltage obtained after re-setting and the early-period set value to become larger as the accumulated working time of the fuel cell increases, and (ii) an operation of causing difference between the value of the remaining charge target value obtained after re-setting and the early-period set value to become larger as the accumulated working time of the fuel cell increases.

4. A control method for a fuel cell system, comprising:
(a) acquiring a current-voltage characteristic of a fuel cell;
(b) determining whether or not the current-voltage characteristic has declined to a level that is lower by at least a pre-determined amount than an early-period level of the current-voltage characteristic occurring during an early period; and
(c) if the current-voltage characteristic of the fuel cell has declined to the level that is lower by at least the pre-determined amount than the early-period level of the current-voltage characteristic of the fuel cell, executing at least one of (i) an operation of re-setting a high-potential avoidance voltage to a value that is less than an early-period set value, if the current-voltage characteristic of the fuel cell has declined to the level that is lower by at least the pre-determined amount than the early-period level of the current-voltage characteristic of the fuel cell, and (ii) an operation of re-setting a remaining charge target value of a secondary cell that is a lower limit of amount of charge held by the secondary cell to a value that is larger than a set value used during the early period.

* * * * *